United States Patent [19]
Horikawa

[11] Patent Number: 5,837,950
[45] Date of Patent: Nov. 17, 1998

[54] DRAWER TYPE CIRCUIT BREAKER WITH DRAWER CONTACTS BIASED AGAINST CONTACT ARCUATE PORTIONS AND EXTERNAL CONNECTION TERMINALS

[75] Inventor: Masao Horikawa, Nara, Japan

[73] Assignee: Terasaki Denki Sangyo Kabushiki Kaisha, Osaka, Japan

[21] Appl. No.: 892,997

[22] Filed: Jul. 15, 1997

[51] Int. Cl.⁶ .............................. H02B 11/00; H01H 1/58; H01H 9/00
[52] U.S. Cl. .................................... 200/50.21; 200/50.27; 361/608
[58] Field of Search .............................. 200/50.21, 50.22, 200/50.23, 50.24, 50.25, 50.26, 50.27, 237, 249–251, 259–261; 361/605, 608, 609; 335/132

[56] References Cited

U.S. PATENT DOCUMENTS

| | | | |
|---|---|---|---|
| 3,562,459 | 2/1971 | Bould et al. | 218/18 |
| 4,546,220 | 10/1985 | Mostosi | 200/50.24 |
| 5,335,140 | 8/1994 | Kamino et al. | 361/608 |

*Primary Examiner*—J. R. Scott
*Attorney, Agent, or Firm*—Wenderoth, Lind & Ponack, LLP

[57] ABSTRACT

In a drawer type circuit breaker of the invention, when a first contact is clockwise pivoted by a switching mechanism, the contact tip of the first contact and the contact tip of a second contact are touched, and when the first contact is further clockwise pivoted, the second contact is counterclockwise pivoted against the elastic force of a spring to secure a predetermined contact pressure and a predetermined wiping stroke. A first drawer contact clamps the outer circumferential portion of the first contact and a first external connection terminal together by the elastic force of a spring to establish connection between the first contact and the first external connection terminal. A second drawer contact clamps the outer circumferential portion of the second contact and a second external connection terminal together by the elastic force of another spring to establish connection between the second contact and the second external connection terminal.

10 Claims, 5 Drawing Sheets

DRAWER TYPE CIRCUIT BREAKER WITH DRAWER CONTACTS BIASED AGAINST CONTACT ARCUATE PORTIONS AND EXTERNAL CONNECTION TERMINALS

BACKGROUND OF THE INVENTION

1. Field of the Invention

The present invention relates to the structure of contacts in a drawer type circuit breaker.

2. Description of the Related Art

Circuit breakers, in particular large-sized circuit breakers, are typically constructed as a drawer type circuit breaker that allows one to take out the unit of the circuit breaker without taking off wires from external during check and maintenance service.

FIG. 5 shows such a conventional drawer type circuit breaker. In FIG. 5, the circuit breaker is in its connected position, where a circuit breaker main unit 60 is housed in a frame 61 to be electrically connected to the frame 61, with the main unit 60 in its closed circuit state. A current flows between a terminal 62 and a terminal 71 through a path constructed of a drawer contact 63, a fixed contact 64, a contact tip 65, a contact tip 66, a movable contact 67, a flexible conductor 68, a main unit terminal 69, and a drawer contact 70. The terminals 62 and 71 are fixed to the frame 61, one of them being connected to a power supply through an external wire and the other being connected to a load through the other external wire. The fixed contact 64 and the main unit terminal 69 are supported by the breaker main unit 60. When a switching mechanism 72 is operated, the movable contact 67 to which one end of the main unit terminal 69 is connected through the flexible conductor 68 pivots about its fixed axis, permitting the contact tips 65 and 66 respectively secured to one ends of the fixed contact 64 and the movable contact 67 to be contacted with and separated from each other to open and close the circuit breaker.

The circuit breaker has a spring 76 biasing the movable contact 67 to press the contact tip 66 toward the contact tip 65 of the fixed contact 64. Contact pressure and wiping stroke at contact point is set such that a reliable and stable contact condition is established therebetween in the closed stateof the circuit breaker. The drawer contacts 63, 70 are respectively arranged at the other ends of the fixed contact 64 and the main unit terminal 69 as main unit side terminals. By using the elastic force of springs 75, the terminals 62, 71 as frame side terminals are respectively connected to the fixed contact 64 and main unit terminal 69 through the drawer contacts 63, 70.

In the drawer type circuit breaker thus constructed, when the circuit breaker main unit 60 is shifted leftward in FIG. 5, the fixed contact 64 and the main unit terminal 69 as the main unit side terminals come out of contact with the terminals 62, 71 as the frame side terminals, respectively, so that the circuit breaker main unit 60 reaches its disconnected position where it is disconnected from the circuits of the power supply and the load.

Since the drawer type circuit breaker of this sort employs the spring 76 attached to the movable contact 67 linked to the switching mechanism 72 to achieve a reliable and stable contact condition, its construction is rendered complex. Furthermore, the flexible conductor 68 connects between the movable contact 67 and the main unit terminal 69, and a total of seven contact points are present between the power supply side terminal and the load side terminal. At each contact point, Joule heat which causes higher temperature rise is generated. Since the fixed contact 64 and the main unit terminal 69 extend substantially rightward as shown in FIG. 5, these elements generate heat by themselves to result in higher temperature rise and increase the depth dimension of the unit to result in a bulky circuit breaker.

SUMMARY OF THE INVENTION

Accordingly, it is an object of the present invention to provide a drawer type circuit breaker which is compact, reliable in operation and free from temperature rise.

To achieve the above object, a drawer type circuit breaker according to the present invention includes a structure for setting the contact pressure and wiping stroke of contacts, in a fixed side rather than a switching mechanism side. The contacts mounted on the fixed side are of a pivotal type and drawer contacts for maintaining contact with the pivotal contacts are provided. With this arrangement, the size of the unit is reduced in depth dimension and thus the conductors are accordingly shortened to suppress temperature rise. Furthermore, the drawer contacts presents a reliable contact condition.

In the drawer type circuit breaker of the present invention, one end of a second contact that can be contacted with and separated from a first contact operated by a switching mechanism is pivotally supported on a fixed member of the circuit breaker main unit, the supported point being positioned close to the contact positions of both contacts and on an extension line of a second external connection terminal. With this arrangement, the depth dimension of the unit is reduced. The second contact has at the other end a contact portion to be in contact with the first contact, and the second contact is biased to be in contact with the first contact. The external shape of the one end of the second contact which is pivotally supported is terminated in a circumferential arc portion centered on its pivot axis so that, when pivoted, the second contact stably makes sliding contact with a second drawer contact to be described later.

The fixed member of the circuit breaker main unit is provided with the second drawer contact. The second drawer contact has one end that biased to be in contact with the circumferential arc portion at the pivotal end of the second contact and the other end biased to be in contact with the second external connection terminal when the circuit breaker main unit is in its connected position. The one end of the second drawer contact makes sliding contact, in an arc orbit, with the second contact which is pivoted when connected to and disconnected from the first contact. The other end of the second drawer contact makes sliding contact, in an linear orbit, with the second external connection terminal when the circuit breaker main unit is inserted and pulled out.

DESCRIPTION OF THE PREFERRED EMBODIMENTS

Figure 1:
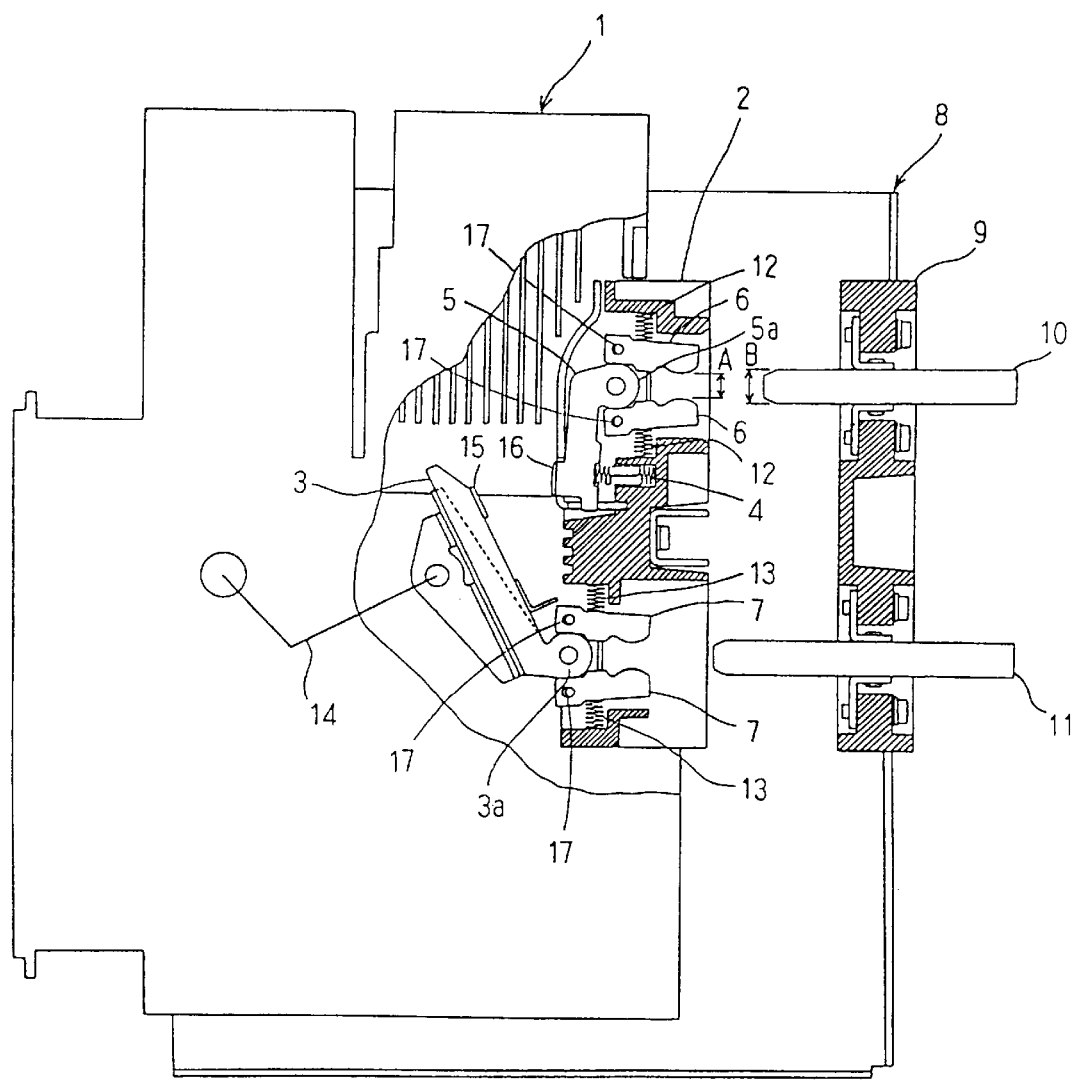
FIGS. 1 to 3 are side sectional views of a drawer type circuit breaker according to an embodiment of the present invention, respectively, FIG. 1 showing a circuit breaker main unit in its disconnected position with contacts in their separated state from each other, FIG. 2 showing the circuit breaker main unit in its connected position at the moment that the contacts touch each other, and FIG. 3 showing the circuit breaker main unit in its connected position with the contacts in their fully contacted state with each other.
Figure 2:
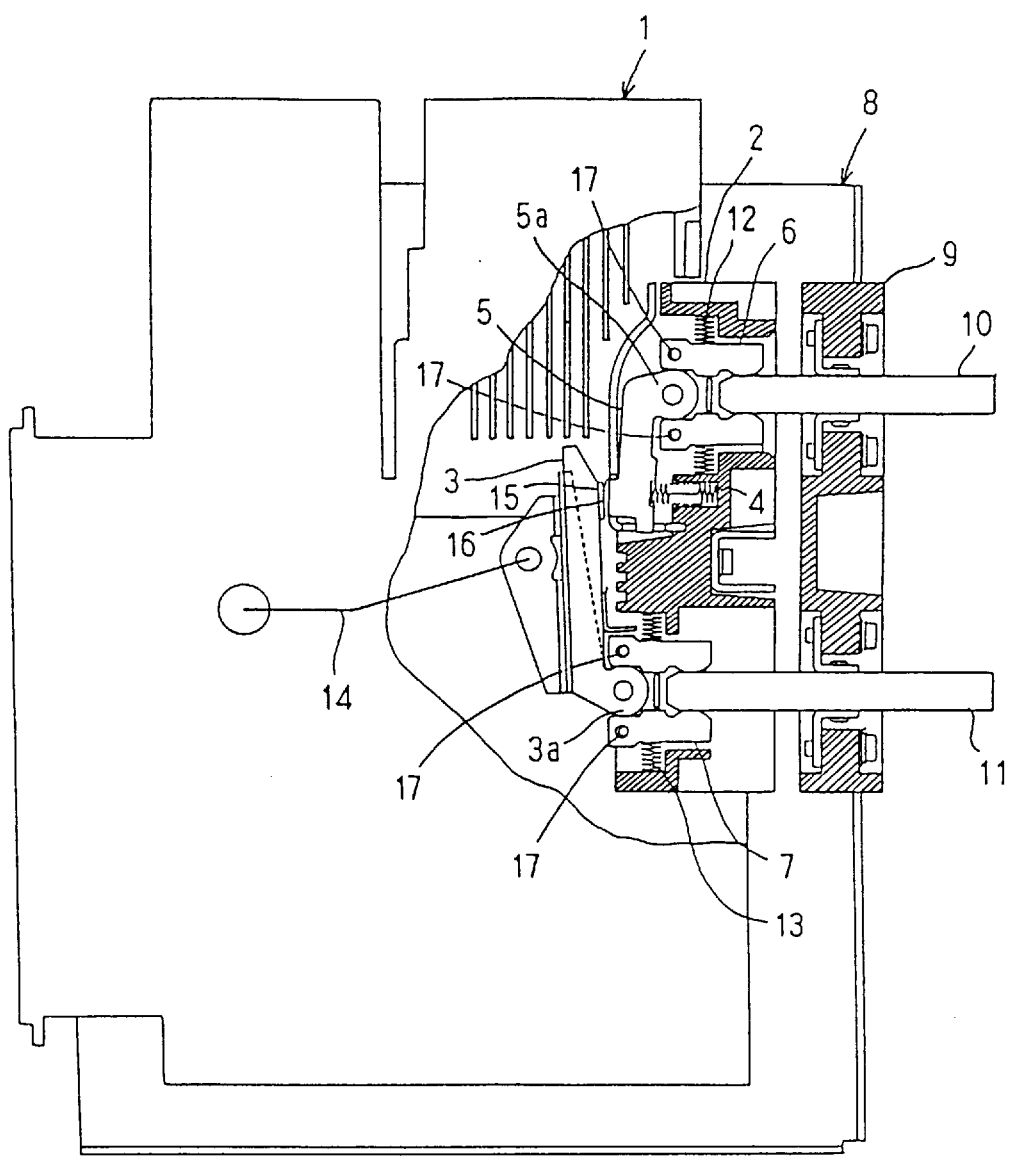
Figure 3:
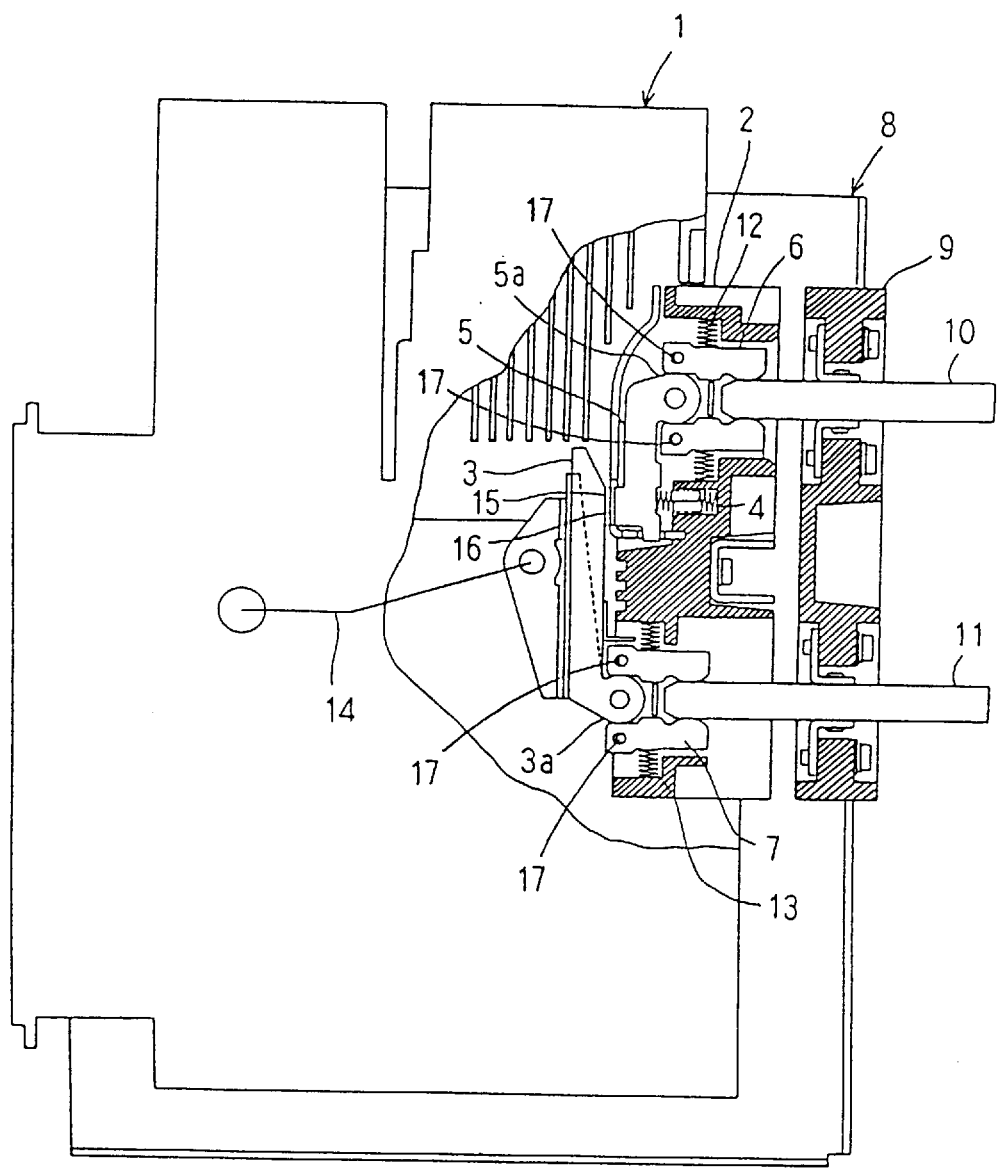

Referring to FIGS. 1 to 3, a circuit breaker according to one embodiment of the present invention is now explained. FIG. 1 shows a main unit of the circuit breaker which is in its disconnected position with its switch contacts in their separated state from each other, FIG. 2 shows the circuit breaker main unit which is in its connected position at the moment the switch contacts touch each other, and FIG. 3 shows the main unit of the circuit breaker which is in its connected position with the switch contacts in their fully contacted state with each other.

A first contact 3 and a second contact 5 biased toward the first contact 3 by a bias spring 4 are respectively pivotally supported on an insulating base 2 of the circuit breaker main unit 1. First and second external connection terminals 11, 10 are respectively mounted on an insulating base 9 of a frame 8. The pivot axes of the first contact 3 and the second contact 5 lie on the extension lines of the first and second external connection terminals 11, 10, respectively. In particular, since the pivot axis of the second contact 5 is horizontally and vertically close to its contact tip 16 as a contact portion, the entire length of the second contact 5 is short, and the depth dimension of the circuit breaker main unit 1 is thus reduced. The pivotal ends of the first and second contacts 3 and 5 have outer circumferential portions 3a and 5a, respectively, formed of circumferential arc portions centered on the pivot axes of the respective contacts.

Mounted on the insulating base 2 are a first pair of drawer contact members 7 having respective pin holes therein and a second pair of drawer contact members 6 having respective pin holes therein. Each of the first and second drawer contact members 7 and 6 is movably supported by a pin 17 inserted through the respective pin hole. Referring to FIG. 2, the second drawer contact members 6 clamp the outer circumferential portion 5a of the second contact 5 and one end of the external connection terminal 10 by the elastic force of springs 12, thus electrically connecting the second contact 5 to the external connection terminal 10. Similarly, the first drawer contact members 7 clamp the outer circumferential portion 3a of the first contact 3 and one end of the external connection terminal 11 by the elastic force of springs 13, thus electrically connecting the first contact 3 to the external connection terminal 11.

The closing operation of the circuit breaker main unit 1 is now discussed. When a switching mechanism 14, only roughly shown in FIG. 1, operates to clockwise rotate the first contact 3, the contact tip 15 of the first contact 3 is touched to the contact tip 16 of the second contact 5 as shown in FIG. 2. When the first contact 3 is further clockwise rotated, the second contact 5 pivots counterclockwise against the elastic force of the bias spring 4 as shown in FIG. 3, and thus a predetermined contact pressure and a predetermined wiping stroke of the contact points are assured. Although the outer circumferential portion 3a of the first contact 3 and the outer circumferential portion 5a of the second contact 5 also pivot, the contact conditions with the drawer contact members 7 and 6 are maintained because the outer circumferential portions 3a and 5a are circumferentially arc shaped and centered on the respective pivot axes.

The insertion operation of the circuit breaker main unit 1 is now discussed. As shown in FIG. 1, a spacing A between the ends of the pair of drawer contact members 6 is smaller than the thickness B of the external connection terminal 10. Similarly, a spacing between the ends of the pair of drawer contract members 7 is smaller than the thickness of the external connection terminal 11. When the circuit breaker main unit 1 is shifted rightward in FIG. 1, the contact members 6 and 7 are put into contact with the external connection terminals 10 and 11, respectively, and are displaced with the space between their ends widened as shown in FIG. 2. Since each of the pin holes formed in the drawer contact members 6 and 7 has a larger diameter with sufficient margin than that of the pin 17, the drawer contact members 6 and 7 are displaced without any difficulty. Even if there is a deformation in the outer circumferential portions 5a and 3a, it may be accommodated. Thus, an excellent contact condition is assured between the second contact 5 and the drawer contact members 6, between the drawer contacts 6 and the external connection terminal 10, between the first contact 3 and the drawer contacts 7, and between the drawer contact members 7 and the external connection terminal 11.

Figure 4:
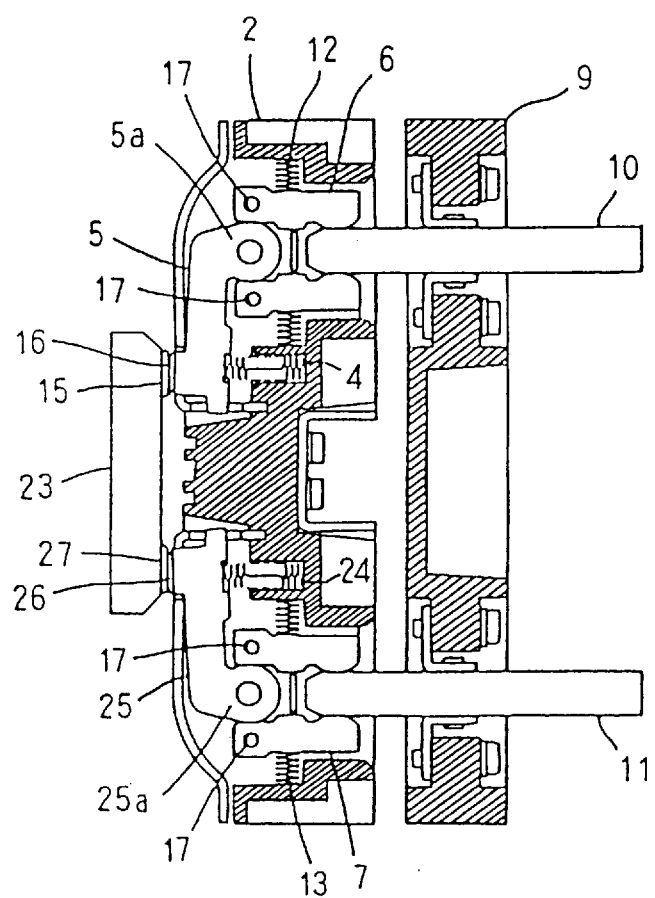
FIG. 4 is a side sectional view showing a major portion of a drawer type circuit breaker according to another embodiment of the present invention.
Figure 5:
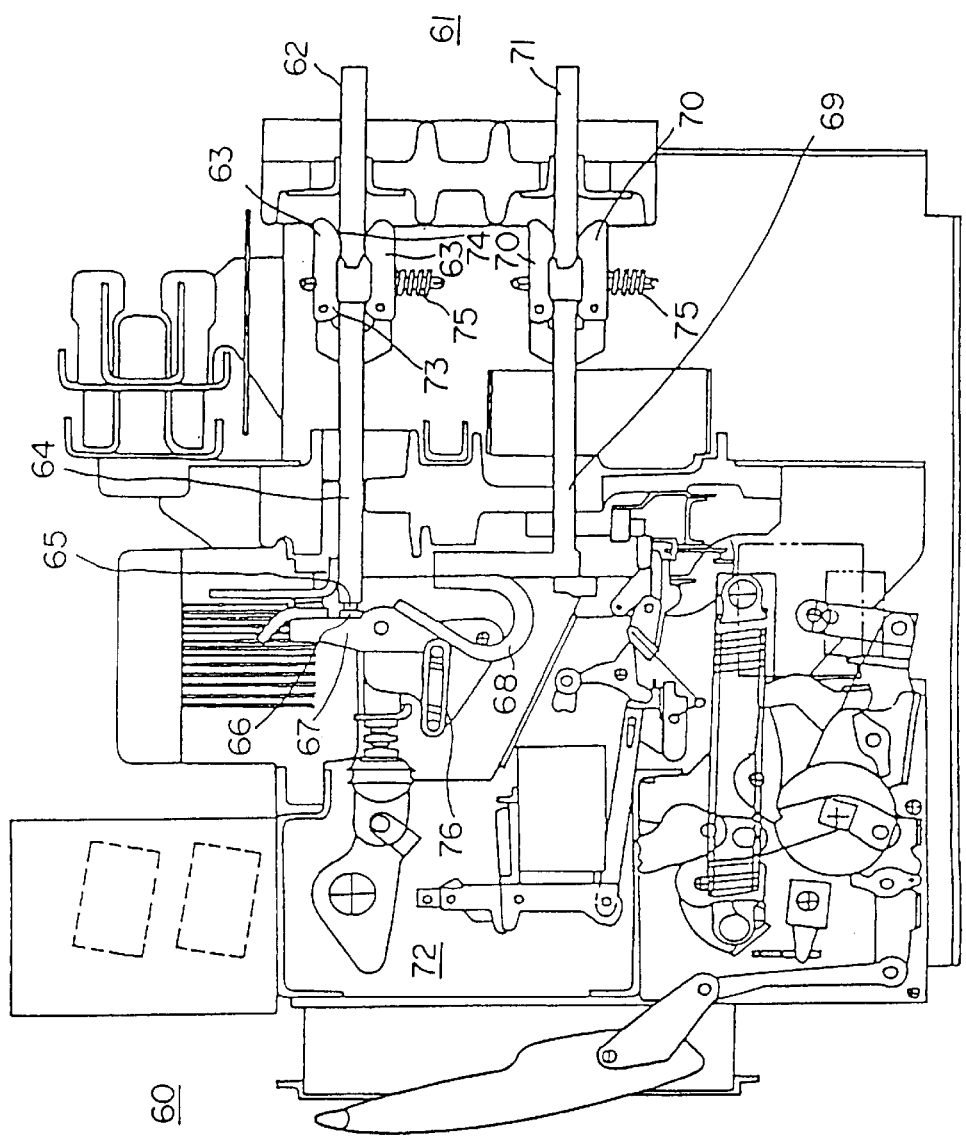
FIG. 5 is a side sectional view showing a conventional drawer type circuit breaker wherein a circuit breaker main unit is in its connected position with contacts in their separated state from each other.

In the above embodiment, the first contact 3 is of a hinged type with the contact tip 15 at its one end. As shown in FIG. 4, however, a first contact 23 having a contact tip 15 and a contact tip 27 respectively at both ends thereof may be moved horizontally in parallel by an unillustrated mechanism, and a second contact 5 facing one end of the first contact 23 and a third contact 25 facing the other end of the first contact 23 may be arranged. Like the second contact 5, the third contact 25 is pivotally supported at its pivot axis which is horizontally and vertically close to its contact point 26 as a switch contact portion, and is biased toward the first contact 23 by a bias spring 24. The pivot axis of the third contact 25 lies on the extension line of the first external connection terminal 11, and the outer circumferential portion 25a at the pivotal end is of a circumferential arc centered on the pivot axis. The first drawer contact members 7 clamp the outer circumferential portion 25a of the third contact 25 and the end of the first external connection terminal 11 by the elastic force of springs 13, thus electrically connecting the third contact 25 to the external connection terminal 11.

As described above, according to the present invention, the structure for setting the contact pressure and wiping stroke is arranged on the fixed member side. The construction of the main unit can be thus simplified, and the second contact can be shortened. A compact drawer type circuit breaker with sufficient temperature margin is thus provided.

The use of the hinged type first contact dispenses with the conventional flexible conductor, thereby reducing the number of components, manufacturing steps and switching points. Thus, more temperature margin is provided.

In the circuit breaker having the parallel displacement type first contact with the second contact and third contact at its both ends, the number of switching points is only two, and current cutoff performance is substantially improved.

What is claimed is:

1. A drawer type circuit breaker including a frame having an external connection terminal and a circuit breaker main unit which is movable between a connected position and a disconnected position along the frame, the circuit breaker main unit comprising:
a first movable contact having a first contact tip at one end thereof;
a second contact pivotally supported at its one end and terminated in an outer circumferential arc portion centered on the pivot axis at the one end, the second contact having at the other end thereof a second contact tip to be contacted with and separated from the first contact tip of the first contact;

a drawer movable contact to be contacted with and separated from the external connection terminal in response to the movement of the circuit breaker main unit;

first bias means for biasing the drawer contact to be in contact with both the outer circumferential arc portion of the second contact and the external connection terminal when the circuit breaker main unit is in the connected position;

second bias means for biasing the other end of the second contact toward the first contact; and a switching mechanism for moving the first contact so that the first contact tip is contacted with and separated from the second contact tip.

2. A drawer type circuit breaker according to claim 1 further comprising:

the other external connection terminal mounted to the frame;

the other drawer movable contact to be contacted with and separated from the other external connection terminal in response to the movement of the circuit breaker main unit; and third bias means for biasing the other drawer contact to be in contact with the other external connection terminal when the circuit breaker main unit is in the connected position, the switching mechanism electrically opening and closing between the external connection terminal and the other external connection terminal by moving said first contact to contact and separate the first contact tip with and from the second contact tip.

3. A drawer type circuit breaker according to claim 2 wherein the first contact is pivotally supported at the other end thereof and is terminated in an outer circumferential arc portion centered on the pivot axis at the other end, the other drawer contact being biased by the third bias means so that the other drawer contact is in contact with both the outer circumferential arc portion of the first contact and the other external connection terminal when the circuit breaker main unit is in the connected position.

4. A drawer type circuit breaker according to claim 2 further comprising:

a third contact pivotally supported at its one end and is terminated in an outer circumferential arc portion centered on the pivot axis at the one end, the third contact having at the other end thereof a third contact tip; and fourth bias means for biasing the other end of the third contact toward the first contact, the first contact being parallel movable and having at the other end thereof a fourth contact tip to be contacted with and separated from the third contact tip of the third contact, the other drawer contact being biased by the third bias means so that the other drawer contact is in contact with both the outer circumferential arc portion of the third contact and the other external connection terminal when the circuit breaker main unit is in the connected position.

5. A drawer type circuit breaker according to claim 1 wherein the drawer contact comprises a pair of members between which the outer circumferential arc portion of the second contact is inserted, each member being provided with a pin hole and retained with play by inserting therethrough a pin having a diameter smaller than the diameter of the pin hole.

6. A drawer type circuit breaker according to claim 1 wherein the pivot axis of the second contact lies on an extension line of the external connection terminal.

7. A drawer type circuit breaker according to claim 3 wherein the other drawer contact comprises a pair of members between which the outer circumferential arc portion of the first contact is inserted, each member being provided with a pin hole and retained with play by inserting therethrough a pin having a diameter smaller than the diameter of the pin hole.

8. A drawer type circuit breaker according to claim 3 wherein the pivot axis of the first contact lies on an extension line of the other external connection terminal.

9. A drawer type circuit breaker according to claim 4 wherein the other drawer contact comprises a pair of members between which the outer circumferential arc portion of the third contact is inserted, each member being provided with a pin hole and retained with play by inserting therethrough a pin having a diameter smaller than the diameter of the pin hole.

10. A drawer type circuit breaker according to claim 4 wherein the pivot axis of the third contact lies on an extension line of the other external connection terminal.

* * * * *